A. ELSON.
INSERTED SAW TOOTH AND LOCKING MECHANISM THEREFOR.
APPLICATION FILED MAR. 28, 1913.

1,079,594.

Patented Nov. 25, 1913.

UNITED STATES PATENT OFFICE.

ARTHUR ELSON, OF BOSTON, MASSACHUSETTS.

INSERTED SAW-TOOTH AND LOCKING MECHANISM THEREFOR.

1,079,594.   Specification of Letters Patent.   Patented Nov. 25, 1913.

Application filed March 28, 1913.   Serial No. 757,303.

*To all whom it may concern:*

Be it known that I, ARTHUR ELSON, a citizen of the United States, residing at Boston, county of Suffolk, State of Massachusetts, have invented a certain new and useful Improvement in Inserted Saw-Teeth and Locking Mechanism Therefor, of which the following is a specification, reference being had therein to the accompanying drawings.

The invention relates to saws having inserted teeth and relates especially to the form of construction of the bit or tooth and of the locking means for securing the bit or tooth in the plate of the saw.

The invention will be fully understood from the following description taken in connection with the accompanying drawings, and the novel features thereof will be pointed out and clearly defined in the claims at the close of this specification.

Referring to the drawings,—Figure 1 is a side elevation of a portion of a circular saw broken away showing one of the saw teeth inserted and locked in position for use and showing one of the spaces with the saw tooth and locking plate about to be inserted. Fig. 2 is a side elevation of one of the saw teeth. Fig. 3 is a side elevation of the locking plate. Fig. 4 is a perspective view of the locking block. Fig. 5 is a section on line 5—5 of Fig. 3. Fig. 6 is a section on line 6—6 of Fig. 1. Fig. 7 is a section on line 7—7 of Fig. 2. Fig. 8 is a side elevation of a modified form of the tooth and locking plate showing rounded lower corners. Fig. 9 is a view of the insertion strip for use with worn teeth.

Referring to the drawings,—1 represents the saw plate having spaces 2 to receive the inserted bits or teeth 3 and the tapered locking pieces or shanks 4. The sides 5, 6, 7 of the spaces 2 are respectively formed with grooves, preferably in the form of reëntering bevels to receive corresponding tongues or beveled edges of the bit or tooth 3 and the locking plate or shank 4. The side 7 forms a right angle with the bottom 6 of the space 2, while the side 5 forms an acute angle with the bottom 6 of the space 2. The tooth 3 is formed with the tooth point 8. Below the tooth point the blade is beveled on the sides 9, 10 up to the necessary height and also on the bottom 12. The side 9 which is adapted to engage with the beveled groove 5 in the side of the space 2 is at an acute angle to the bottom 12, preferably making an angle of about 89°, while the side 10 is at an obtuse angle with the bottom 12, being a little more off from a right angle than the angle between the side 9 and bottom 12.

The locking plate 4 is beveled on the left-hand side 13 and on the bottom 14, while on the right-hand side 15 it is formed with a reëntering bevel or groove. The side 13 forms a right angle with the bottom 14, while the side 15 forms an acute angle with the bottom 14. The top 16 of the locking plate 4 is preferably flat and parallel with the bottom 14.

The body of the bit or tooth below the point and also the main body of the locking plate 4 are preferably slightly less in thickness than the thickness of the saw plate 1. The angle which the side 10 of the tooth makes with the bottom 12 is as much greater than a right angle as the angle which the side 15 of the locking plate makes with the bottom 14 is less than a right angle. The acute angle which the side 9 of the tooth makes with the bottom 12 is nearer a right angle than the angle which the side 15 of the locking plate makes with the bottom 14.

The locking plate 4 is formed with a cut-out space 17 extending entirely through the locking plate and has a comparatively narrow passage 18 leading from the main opening out through the grooved side 15 of the locking plate. The interior edge of the locking plate below the space 17 is formed with a reëntering bevel or groove 19 for the purpose which will be hereinafter described.

The body or shank of the tooth 3 is formed with recesses 20 in each face extending to the edge 10. A bifurcated member 21 has the two branches 22—22 which straddle the thin edge portion of the tooth formed by the recesses 20, and a pivot pin 23 passes through the tooth and through the perforated ears of the branches 22—22 of the arm 21. When the tooth 3 and the locking plate 4 are brought together with the bevel 10 fitting in the groove 15 the said arm 21 extends through the narrow passage 18 into the space 17 of the locking plate. This narrow passage 18 should be of sufficient width to allow the passage of the arm 21 through it and rounded off to allow the arm to pass through it whether the arm is in a horizontal or inclined position as it swings on the pivot 23, but the narrow passage should be no wider than this demands.

For convenience in manufacturing the bottom corners of the space 2 may be rounded into short curves, if desired, in which case the corresponding angles of the locking plate and bit should be correspondingly rounded as shown in Fig. 8.

A locking block 24 is formed with a beveled lower edge 25 which is adapted to fit into and slide in the bevel groove 19 in the bottom of the space 17 of the locking plate.

To insert the tooth it is first assembled with the locking plate 4 with the beveled edge 10 engaging the groove 15 in the side of the locking plate and the arm 21 extending through the entrance 18 into the opening 17 in the locking plate, so that the arm 21 will extend into the space 17 at a downward inclination reaching nearly or quite to the bottom of the space 17. The combined width of the tooth and the locking plate assembled in this position is such in relation to the width of the space 2 in the saw plate that they will just pass into the space 2, the beveled edge 9 of the tooth sliding down in the groove 5 in one side of the plate space 2 and the beveled edge 13 of the locking plate sliding in the groove 7 on the opposite side of the space 2. The tooth and locking plate are then pushed down until the lower beveled edge 12 of the tooth is seated in bevel groove 6. The locking block 24 is inserted into the space 17 beneath the arm 21 and with its beveled edge 25 in the groove 19, the arm 21 resting on the top of the block 24. When first inserted, the locking block 24 should be in the right-hand part of the opening 17 as viewed from Fig. 1, that is, on the side nearer the entrance 18. The block 24 should then be moved along its grooved seat toward the left in the position viewed in Fig. 1 which will thereby lift up the end of the arm 21, turning it on its pivot, and in so doing the upper edge of the arm 21 will by its engagement with the metal on the upper side 26 of the entrance 18 to the space 17 force the locking plate 4 upward and on account of the angles which the sides 10 and 15 make respectively with the lower edges 12 and 14 of the tooth and locking plate and the narrowing upward of the space 2 formed by the angular relation of the sides 5 and 7 of the space with relation to each other and to the bottom 6, the locking plate 4 will have a wedging effect, locking the tooth and the locking plate between the two opposite edges 5 and 7 of the space 2, while the direction of the motion tends to keep the bottom edge 12 of the tooth still seated in the groove 6, although the locking plate 4 is moved upward.

If desired, a piece of wire or spring 28 may be put in along the edge 19 to hold the locking block 24 and prevent its sliding back to the right after it has been moved to the left to lock the saw tooth. The leverage of the arm 21 is normally sufficient to hold the locking block 24 in place, the use of a wire, such as referred to, being merely to hold the locking block against any possible displacement.

If the tooth becomes worn down or has been ground down too short, one or more strips such as shown at 27 may be placed in the groove 6, these strips being grooved to receive the bevel 12 at the bottom edge of the tooth.

The tooth should preferably be made of steel or other material suitable for sawing metal, for example, high speed steel, while the saw plate and locking plate may be made of relatively inexpensive material suitable for holding the tooth.

What I claim is:

1. In combination with a saw plate, a plurality of peripheral recesses, each to receive a removable tooth, said recesses being narrower at the top than at the bottom, a tooth and a locking plate having a tongue and groove connection with each other and slidable with relation to each other, the sides of said recesses and the sides of said assembled tooth and locking plate having a tongue and groove connection with each other whereby the assembled tooth and locking plate are slidable into connection with said saw plate, said locking plate being formed with an opening therethrough having a contracted entrance on the edge adjacent to the said tooth, an arm pivoted to said tooth and extending into said recess in the locking plate, a locking block having a tongue and groove connection with the inner edge of the opening in said locking plate and supporting the swinging end of said pivoted arm, said locking block being movable whereby said swinging arm is turned on its pivot to move said locking plate toward the open end of the recess in the saw plate, the locking plate and tooth having inclined sides whereby the movement of the locking plate toward the open end of the said recess in the saw plate locks the tooth in position.

2. In combination with a saw plate, a plurality of peripheral recesses, each to receive a removable tooth, said recesses being narrower at the top than at the bottom, a tooth and a locking plate having a tongue and groove connection with each other and slidable with relation to each other, the sides of said recesses and the sides of said assembled tooth and locking plate having a tongue and groove connection with each other whereby the assembled tooth and locking plate are slidable into connection with said saw plate, said locking plate being formed with an opening therethrough having an entrance on the edge adjacent to the said tooth, an arm pivoted to said tooth and extending into said recess in the locking plate, said arm being adapted to be turned on its pivot and thereby move said locking plate toward the open end of the recess in the saw plate and bind the saw tooth firmly to its seat, and means whereby said arm is retained in said locking position.

3. In combination with a saw plate, a plurality of peripheral recesses, each to receive a removable tooth, said recesses being narrower at the top than at the bottom, a tooth having sides, one of which is at an acute angle to the bottom edge of the tooth and the other of which is at an obtuse angle to the bottom edge, the acute angle made by the one side being nearer a right angle than is the obtuse angle made by the other side, a locking plate coöperating with said tooth in the space between the tooth and one side of said recess and having the side which is adjacent to the tooth inclined to its base, forming an angle which is as much less than a right angle as the angle made by the said adjacent side of the tooth is greater than a right angle, the opposite side of the locking plate forming a right angle with its base, said locking plate being adapted to be moved toward the open end of said recess in sliding engagement with the edge of said saw tooth and binding said tooth firmly on its seat, and means for locking said locking plate in its adjusted position when the tooth is locked.

In testimony whereof I affix my signature, in presence of two witnesses.

ARTHUR ELSON.

Witnesses:
WILLIAM A. COPELAND,
ALICE H. MORRISON.

Copies of this patent may be obtained for five cents each, by addressing the "Commissioner of Patents, Washington, D. C."